United States Patent [19]

Lawhon et al.

[11] Patent Number: 4,696,691
[45] Date of Patent: Sep. 29, 1987

[54] METHOD OF GLASS BATCH PREHEATING AND LIQUEFYING WITH RECYCLING OF PARTICULATES

[75] Inventors: Robert A. Lawhon, Chehalis, Wash.; Robert B. Heithoff, LaVale, Md.; Wayne H. Gonzalez, Tumwater, Wash.

[73] Assignee: PPG Industries, Inc., Pittsburgh, Pa.

[21] Appl. No.: 914,226

[22] Filed: Oct. 2, 1986

[51] Int. Cl.⁴ .................................................. C03B 3/00
[52] U.S. Cl. .......................................... 65/27; 65/134; 65/135; 65/335
[58] Field of Search ................... 65/27, 134, 135, 136, 65/335, 347

[56] References Cited

U.S. PATENT DOCUMENTS

| | | | |
|---|---|---|---|
| 3,030,094 | 4/1962 | Saeman | 263/52 |
| 3,508,742 | 4/1970 | Minegishi | 263/32 |
| 3,880,629 | 4/1975 | Dulin et al. | 65/27 |
| 4,113,459 | 9/1978 | Mattmuller | 65/135 |
| 4,185,984 | 1/1980 | Kiyonaga | 65/135 |
| 4,208,201 | 6/1980 | Rueck | 65/27 |
| 4,349,367 | 9/1982 | Krumwiede | 65/27 |
| 4,350,512 | 9/1982 | Krumwiede | 65/134 |
| 4,519,814 | 5/1985 | Demarest, Jr. | 65/27 |
| 4,529,428 | 7/1985 | Groetzinger | 65/27 |

FOREIGN PATENT DOCUMENTS 2552116  5/1976  Fed. Rep. of Germany ........ 65/134

Primary Examiner—Arthur Kellogg
Attorney, Agent, or Firm—Dennis G. Millman

[57] ABSTRACT

In a material preheating and liquefying process such as in a glassmaking operation, particulates entrained in the exhaust from the preheating stage are collected and returned to the process at a location where a molten phase is present and re-entrainment is suppressed.

19 Claims, 6 Drawing Figures

METHOD OF GLASS BATCH PREHEATING AND LIQUEFYING WITH RECYCLING OF PARTICULATES

BACKGROUND OF THE INVENTION

In U.S. Pat. No. 4,519,814 (Demarest) there is disclosed a two-stage glass batch liquefaction process wherein glass batch is preheated by contact with exhaust gas from a liquefying stage to which the preheated glass batch is fed. Such an arrangement entails a relatively small exhaust gas volume in the batch preheating stage, particularly when the combustion heat sources are fired with oxygen instead of air, so that direct contact of the exhaust gas stream with dry, pulverulent batch materials is feasible with relatively little entrainment of particulate material by the exhaust gas stream. Recovering waste heat directly into the batch materials is highly advantageous for the sake of reduced plant construction cost and more efficient heat recovery in comparison with a conventional regenerative furnace. However, a small amount of particulate entrainment usually occurs, which can readily be recovered with conventional particulate separating means without significantly detracting from the advantages of the direct heat recovery system. Disposal of the collected particulates can be a problem due to environmental concerns and the rising costs of waste disposal. Recycling the particulates back into the batch mixture is an attractive approach to solving the waste disposal problem, especially when it is considered that the loss of entrained material can slightly altar the composition of the batch mixture and that some raw material cost savings can be realized by recycling the particulates. Such approach is shown in U.S. Pat. No. 3,880,629 (Dulin et al.), U.S. Pat. No. 4,208,201 (Rueck) and U.S. Pat. No. 4,349,367 (Krumwiede). Unfortunately, the fine particles are easily entrained in the exhaust stream again, so that recycling the collected particulates can worsen the entrainment problem and increase the load on the particulate recovery system.

U.S. Pat. No. 3,030,094 (Saeman) and U.S. Pat. No. 3,508,742 (Minigishi) show glass batch melting arrangements that include preheating, but make no provision for handling particulates. U.S. Pat. No. 4,113,459 (Mattmuller) shows means to separate dust from a glass batch preheater, but makes no disclosure regarding disposal of the collected dust particles. U.S. Pat. No. 4,185,984 (Kiyonaga) discloses preheating glass batch and feeding portions of the batch separately to a melter, but does not deal with particulates lost from the preheated stage.

SUMMARY OF INVENTION

In the present invention, particulates separated from exhaust gas from a batch preheating vessel are recycled to the batch melting process without substantial re-entrainment. Rather than returning the collected particulates to the batch mixing station or to the preheating vessel where re-entrainment would be likely, the recycled particulates bypass the preheating stage and are fed separately to a region of the process where the batch is being liquefied or has been liquefied so that the particulates quickly become fused and merge with the liquefying batch material before being exposed to combustion gas currents for a substantial time. By returning the collected particulates to the system at a location where a molten phase is present and the temperature is above the melting point of at least a substantial portion of the particulates, adhesion of the particles to each other and/or to the other batch particles is promoted, thereby suppressing re-entrainment and effecting incorporation of a major portion of the particulates into the liquefying mass. This feature of the present invention is readily accommodated in a process in which the batch material is preheated and then rapidly liquefied in a separate, intensely heated zone, whereby the recycled particulates may be introduced directly into the intensely heated liquefying zone along with the preheated batch material. The two feed streams may enter the liquefier separately, but it is preferred to add the particulates to the preheated batch immediately before it enters the liquefier. Alternatively, the particulates may be fed to the liquefied material downstream from the liquefier, where they quickly melt into the molten mass.

Other features and advantages of the present invention will be evident from the detailed description which follows and from the drawings.

THE DRAWINGS

DETAILED DESCRIPTION

Although the invention is described herein in connection with a glassmaking operation, it should be apparent that the vitreous condition of the final product need not have an effect on the aspects of the process to which the present invention relates. Therefore, the present invention is not limited to processing glass batch, but encompasses processing any pulverulent material by preheating and liquefying. The product could be vitreous, partially vitreous, ceramic, or even metallic.

Figure 1:
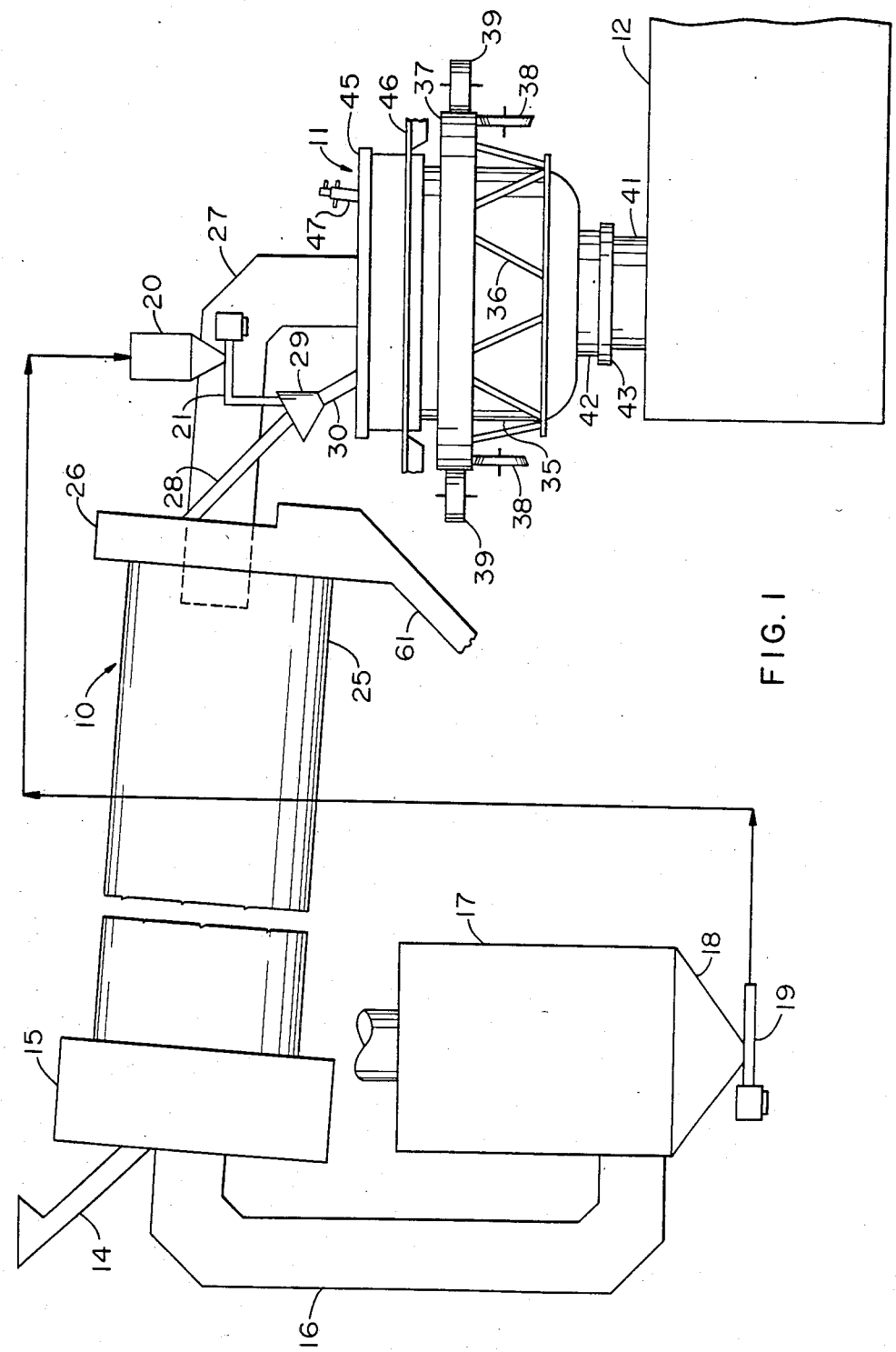
FIG. 1 is a side elevational view of a rotary kiln preheater and a rotary liquefying vessel with a preferred embodiment of the particulate recycling arrangement of the present invention.

In FIG. 1 there is shown the overall arrangement of a rotary kiln 10 feeding batch material to and receiving exhaust gas from a liquefier vessel 11. A vessel 12 may be provided below the liquefier 11 to receive liquefied material for further processing if desired. Reference may be had to U.S. Pat. No. 4,519,814 (Demarest) for details of the construction and operation of the rotary kiln type of preheater and the liquefier vessel that are included in the preferred embodiment here. It should be understood that the particular constructions of the preheater and the liquefier are not critical to the present invention.

Raw materials such as pulverulent glass batch material are fed to the inlet end of the rotary kiln 10 through a delivery chute 14. The inlet end of the rotary kiln is enclosed by a stationary exhaust box 15 that directs exhaust gases leaving the rotary kiln to a duct 16 leading to a particulate separator 17. The a particulate separator may take a variety of forms known to those of skill in the art, including electrostatic precipitators and cyclone separators, but the preferred type is a bag separator in which the exhaust gas is passed through a plurality of heat resistant fabric bags that filter particles from the gas. In this conventional separator apparatus, a group of the bags are periodically taken off-stream and agitated so that the accumulated particles may fall into a hopper portion 18 of the separator apparatus. When processing a typical soda-lime-silica flat glass batch formulation, it has been found that about 10 to 30 parts by weight of particulates are collected for each 1000 parts by weight of glass produced. The chief constituents of the collected particulates are usually soda ash, limestone, and dolomite, in descending order. Typically, the silica source material (sand) is present in the particulates in considerably lower proportions than in the batch. The specific amount of particulates and the relative amounts of the constituents depend upon the fineness of each raw material used in the process.

In accordance with the present invention, the particulate materials are recirculated to the melting process. Thus, in the embodiment shown in FIG. 1, the hopper 18 leads to a screw feeder 19 that conveys the material to a conveyor (shown schematically) such as a pneumatic conveying system. The recycled particulates are fed directly to the liquefier 11, thus bypassing the preheating stage. In this connection, a bin 20 may be provided to receive the particulate material from the conveying system from which the material may be fed by a screw feeder 21 to the main batch feeding means for the liquefier. The location at which the particulates are introduced into the preheated batch stream is preferably free of exhaust gas currents so as to avoid re-entrainment. The intensified heating within the liquefier (preferably oxygen-fired burners) serves to melt the particulates primarily by means of radiant heating very quickly upon entry to the interior of the liquefier. As a result, the particles have very little opportunity to be acted upon by the combustion gas currents within the liquefier that might otherwise cause re-entrainment.

Alternatively, the conveying system may carry the particulates to the receiving vessel 12 downstream from the liquefier 11, where the particulates may be fed by a screw feeder for example (not shown) onto the surface of the body of liquefied material held therein. Because of their small particle size and because the particulates from glass batch tend to be relatively easily melted constituents, heat transferred by contacting the liquefied material is usually sufficient to melt the particulates rapidly. Since the liquefied material is usually subjected to further homogenizing treatment subsequent to this stage, depositing the particulates in the receiving vessel 12 would not be expected to cause inhomogeneities in the final product.

With continued reference to FIG. 1, the preheater 10 may be configured as a conventional rotary kiln with an outer, cylindrical shell of steel 25, an insulating lining, and optionally an inner steel cylinder (not shown). The rotary kiln is mounted for rotation about its cylindrical axis at an angle slightly inclined from horizontal so as to convey the pulverulent material being heated from the inlet end toward the liquefier 11. The outlet end of the rotary kiln is enclosed by a stationary housing 26, and in this embodiment the transfer arrangement of the present invention is contained within the housing 26 which will be described in greater detail hereinafter. An exhaust duct 27 extends from the liquefier 11 into the rotary kiln 10 and conveys the products of combustion from the fuel burning heat sources in the liquefier into the preheater where heat from the waste gases is transferred to the batch material. A tube 28 carries the heated batch material from the preheater to the liquefier. The tube 28 is of sufficient length to accommodate the spacing of the preheater 10 away from the area above the liquefier 11 for the sake of accessibility, and the tube 28 is of sufficient slope to permit free flow of the batch material by gravity (preferably at least about 45°). The tube 28 may lead to a funnel 29 at which supplemental materials such as the recycled particulates may be added to the batch feed stream. The funnel 29, in turn, leads to an adjustable feed tube 30 extending into the liquefier 11, the details of which will be described herein in connection with FIGS. 4, 5, and 6.

The preferred liquefier embodiment is of the type disclosed in U.S. Pat. No. 4,381,934 (Kunkle et al), the disclosure of which is hereby incorporated by reference. The preferred embodiment is that in which a lining of batch material is maintained on the sidewalls and bottom portion of a steel drum 35 that is rotated about a substantially vertical axis. In the embodiment depicted, the drum 35 is supported by a plurality of rods 36 that are hung from a circular frame 37 mounted for rotation on a plurality of support rollers 38 and aligning rollers 39. A central opening in the bottom of a drum 35 permits liquefied material to flow freely from the liquefier into the receiving vessel 12. A stationary refractory collar 41 may be provided to enclose the falling stream. Also it is preferred that a seal be provided between the rotating portion of the liquefier and the stationary surrounding structures, such as by a rotating flange 42 affixed to the bottom of drum 35 extending into a water-containing, annular, stationary trough 43. The open upper end of drum 35 is covered by a stationary lid assembly 45, which may be constructed of ceramic refractory material or of water-cooled metal, and is supported on peripheral stationary frame members 46. The lid 45 may be provided with openings for insertion of one or more burners 47 for heating the interior of the liquefier. Preferably, a plurality of burners spaced around the periphery of the liquefier are employed. Batch material is deposited onto the lining within the liquefier, leaving a central cavity in which combustion from the burners takes place.

Figure 2:
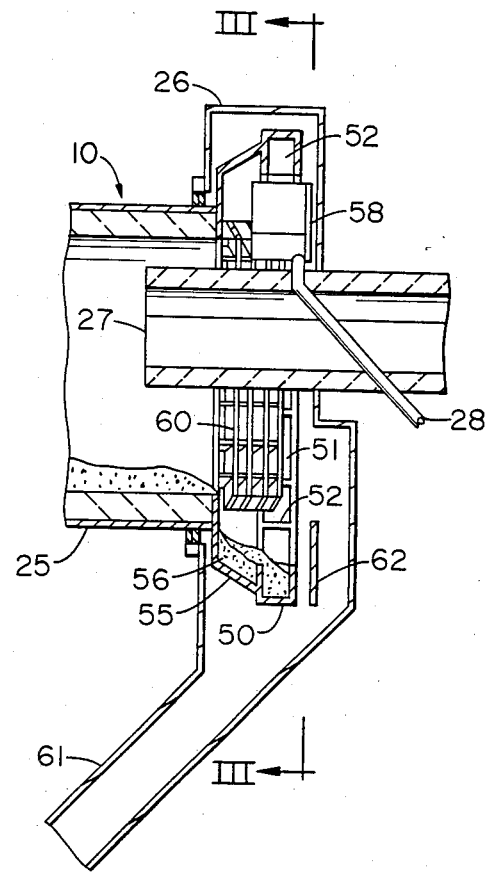
FIG. 2 is a vertical cross-section of the batch discharge end of the rotary kiln depicted in FIG. 1 showing batch elevator means in accordance with a preferred embodiment of the present invention.
Figure 3:
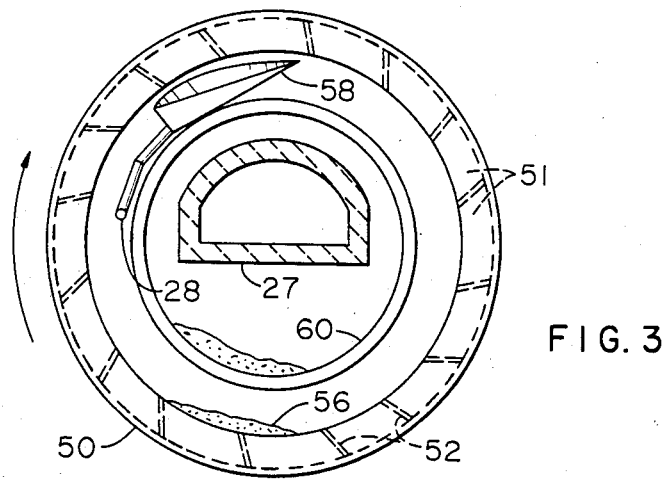
FIG. 3 is a vertical cross-section of the batch discharge end of the rotary kiln taken along line 3—3 in FIG. 2.

A preferred arrangement of the batch transfer mechanism of the depicted embodiment may be seen in the cross-sectional view of the outlet end of the feeder shown in FIG. 2 and in the end view shown in FIG. 3. The basic feature of the batch transfer mechanism shown in FIG. 2 is a bucket elevator type arrangement affixed to the outlet end of the rotary kiln 10, whereby batch material is elevated to a sufficient height to flow by gravity down the tube 28 into which it is discharged. The tube 28 can be of any length dictated by the location in the liquefier to which the batch is to fed, as well as to accommodate the spacing between the preheater and the liquefier. The distance to which the batch travels through the tube 28 and the height to which the batch is elevated by the bucket elevator system are interrelated and are limited by the angle at which the material will flow freely by gravity. Although not preferred, additional length of travel could be achieved by means of auxiliary mechanical devices such as a screw feeder to convey the batch material horizontally during a portion of its travel from the preheater to the liquefier.

The bucket elevator shown in FIGS. 2 and 3 is formed by a circular channel 50 opening radially inward toward the center line of the rotary kiln and compartmented into a plurality of bucket chambers 51 by means of a plurality of divider plates 52. The channel 50 is carried by a continuous flange 55 that spaces the channel axially and radially from the lip of the rotary kiln. The buckets are spaced radially outward from the lip of the rotary kiln so that the batch material exiting the rotary kiln falls freely into the buckets. The axial spacing of the buckets from the end of the rotary kiln is an optional feature intended to create a ledge onto which the batch material falling from the rotary kiln first falls before entering the buckets. The purpose of this feature is to reduce abrasive wear of the buckets by the impact of the pulverulent batch materials. The ledge area is designed to hold a portion of batch material 56 which, due to the lack of partitions in the ledge area, rides constantly in the bottom of the flange area. Thus, batch falling out of the rotary kiln lands on this retained portion of batch 56 rather than on the metal surfaces of the bucket elevator mechanism. In the embodiment depicted in FIG. 3, the bucket partitions 52 are angled so as to prevent discharge of the material until the material is carried to the upper portion of the apparatus. There, the material flows freely from the buckets into a receiving pan 58. To avoid interference with other elements of the apparatus, the bottom surface of the receiving pan 58 is shaped as a conical segment. The lower corner of the receiving pan 58 is provided with an opening to permit the material to flow into the tube 28.

An advantageous but optional feature shown in FIGS. 2 and 3 is a grate 60 at the discharge end of the rotary kiln 10. This grate is aligned with the inner surface of the rotary surface so that material passing from the rotary kiln to the buckets 51 must pass through the grate. Thus the grate serves to separate any unduly large agglomerations of material that may have formed within the rotary kiln. Any very large agglomerations that do not pass through the grate 60 will bypass the bucket elevator by being passed directly from the grate to a bypass discharge chute 61. A baffle plate 62 (FIG. 2) may be provided to assist in isolating the bypass chute pathway from the bucket elevator. Any surges of material from the rotary kiln that overflow the bucket elevator will also pass to the discharge chute 61.

Figure 5:
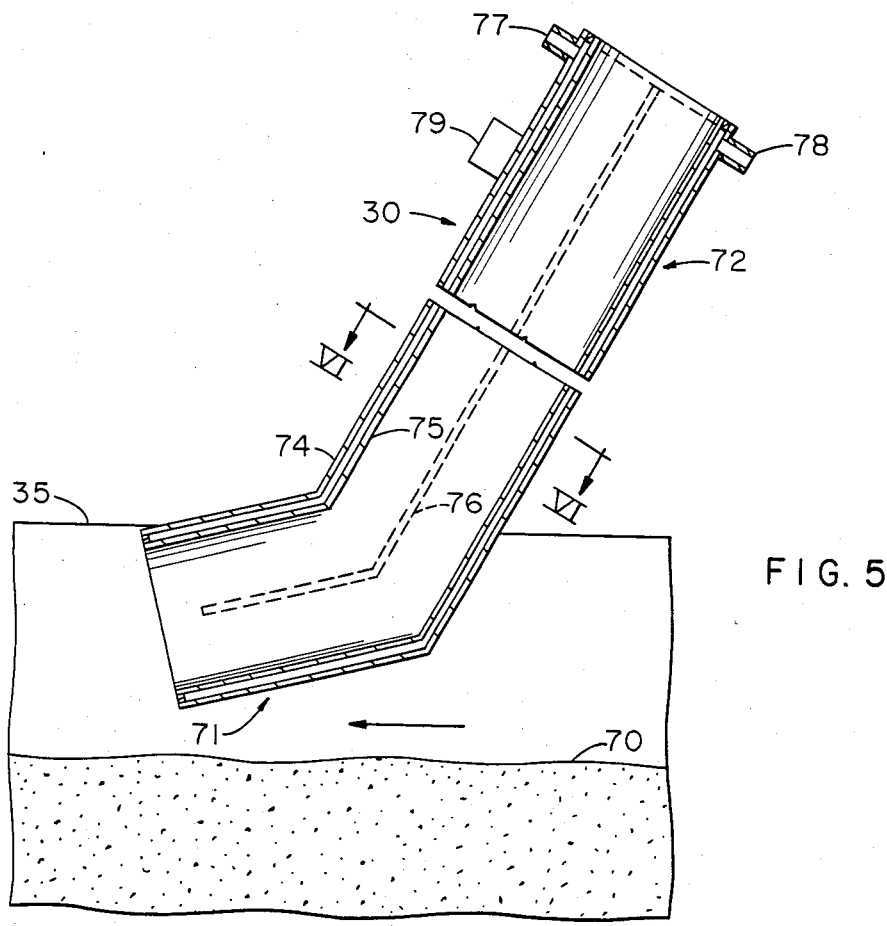
FIG. 5 is an enlarged vertical cross-sectional view of the feed tube of FIG. 4.
Figure 4:
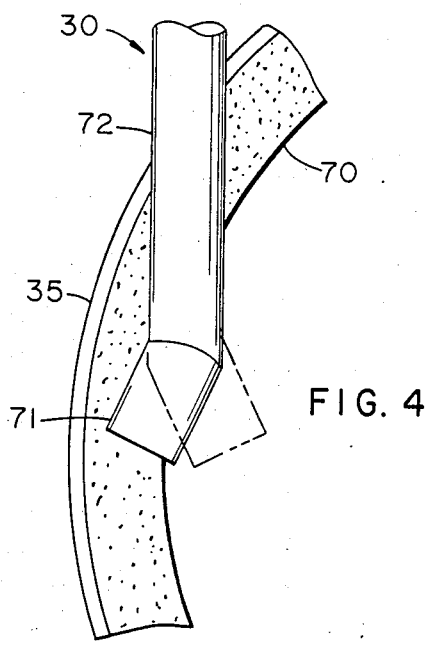
FIG. 4 is a plan view of a portion of the liquefier vessel with the lid removed showing a preferred embodiment of an adjustable feed tube.
Figure 6:
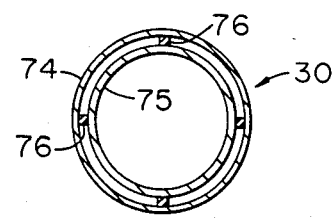
FIG. 6 is a transverse cross-sectional view of the feed tube of FIG. 5 taken along line 6—6.

FIGS. 4, 5, and 6 deal with the details of the feed tube 30 which are being disclosed herein to provide a complete disclosure of the preferred embodiment. This feed tube arrangement, however, is not part of the present invention but is a novel arrangement invented by another. It should be understood that other arrangements could be employed in connection with the present invention for delivering the batch material into the liquefying vessel 11. These alternative arrangements could include a simple, straight tube or a chute with a baffle such as that shown in U.S. Pat. No. 4,529,428 (Groetzinger). Referring to FIG. 4, looking down on an interior portion of the liquefier vessel, the drum 35 has a layer of pulverulent material 70 retained on the interior side thereof. This insulating layer 70 may fluctuate in thickness during operation and in order to deposit the incoming batch material onto the appropriate portion of the layer 70 adjustability of the orientation of the feed tube outlet is provided. In the embodiment shown, this adjustability is achieved by providing the feed tube 30 with an angled end portion 71. When the main portion 72 of the feed tube is rotated about its longitudinal axis, the angled tip portion 71 moves through an arc so the opening at the end of the feed tube can be aligned above different portions of the layer 70. Thus, a simple rotation of the feed tube portion outside the liquefier can alter the location at which the batch is discharged within the liquefier. It is generally desired to feed the batch material onto the uppermost portion of the vertical face of the lining 70. Feeding material too far toward the center beyond the batch layer can lead to undue entrainment of the batch material in the gas streams within the liquefier, and feeding the batch material onto the horizontal end surface of the lining 70 can lead to undue accumulation of batch along the upper rim of the drum 35.

As can be seen in FIG. 5, the angle on the angled tip portion 71 is provided with more of a horizontal component than the main feed tube portion 72 and the tip portion 71 is aimed in a direction substantially tangential to the movement of the adjacent portion of the layer 70 and drum 35. This orientation provides the batch material being discharged from the feed chute with momentum more consistent with that of the material within the rotating liquefier drum, thereby minimizing any scattering and dusting of the material when it lands on the moving layer 70.

Constructional details of the feed tube 30 may be seen in FIGS. 5 and 6. In order to withstand the high temperatures within the liquefying vessel, the tube is preferably provided with cooling means. The cooling arrangement of the embodiment shown in the drawings is provided with annular coolant passageways between an outer cylinder 74 and an inner cylinder 75. Partitions 76 may be provided within the annulus to establish multiple passes for the coolant. Fluid connections 77 and 78 may be provided for respectively supplying and draining the coolant, which is preferably water. As shown in FIG. 5, a radially extending tab 79 may be provided on the portion of the feed tube 30 outside the liquefier for purposes of attaching actuator means for rotating the tube by remote control.

Other variations and modification as would be known to those of skill in the art may be resorted to without departing from the scope of the invention as defined by the claims that follow.

We claim:

1. In a method for processing batch materials wherein pulverulent material is preheated by contact with hot gas whereby particulate material becomes entrained in the gas, and preheated material is transferred to a liquefying zone where intensified heating rapidly renders the material to an at least partially melted liquefied condition, characterized by separating the entrained particulates from the gas and adding the particulates to the preheated material immediately prior to being liquefied so as to incorporate the particulates into the liquefied mass.

2. The method of claim 1 wherein the particulates are added to the preheated material immediately prior to the preheated material entering the liquefying zone.

3. The method of claim 2 wherein the addition of the particulates to the preheated material takes place out of contact with the preheating-gas.

4. The method of claim 1 wherein the particulates are fed to the liquefying zone separately from the preheated material.

5. The method of claim 1 wherein the hot gas for preheating is comprised of exhaust gas from the liquefying zone.

6. The method of claim 1 wherein the material is comprised of glassmaking batch ingredients.

7. In a method for processing batch materials wherein pulverulent material is preheated by contact with hot gas in a preheating zone whereby particulate material becomes entrained in the gas, and preheated material is transferred to a liquefying zone where intensified heating rapidly renders the material to an at least partially melted liquefied condition, characterized by separating the entrained particulates from the gas and feeding the separated particulates directly to the liquefying zone without passing through the preheating zone so as to incorporate the particulates into the liquefied mass.

8. The method of claim 7 wherein the separated particulates are added to the preheated material stream entering the liquefying zone.

9. The method of claim 7 wherein the separated particulates become mixed with the preheated material as it enters the liquefying zone.

10. The method of claim 7 wherein the material in the liquefying zone flows down a sloped surface as it becomes liquefied.

11. The method of claim 7 wherein the pulverulent material is comprised of glassmaking batch ingredients.

12. In a method for processing batch material wherein pulverulent material is preheated by contact with hot gas whereby particulate material becomes entrained in the gas, and preheated material is transferred to a liquefying zone where intensified heating rapidly renders the material to an at least partially melted liquefied condition, characterized by separating the entrained particulates from the gas and adding the particulates to liquefied material downstream from the liquefying zone so as to incorporate the particulates into the liquefied mass.

13. The method of claim 12 wherein the liquefied material is drained from the liquefying zone and received in a vessel containing a pool of liquefied material to which the separated particulates are added.

14. The method of claim 13 wherein the liquefied material is provided with homogenizing treatment after addition of the separated particulates.

15. The method of claim 12 wherein the material is comprised of glassmaking batch materials.

16. The method of claim 15 wherein the largest component of the separated particulates is soda ash.

17. In a multi-stage process for liquefying batch material wherein a mixture of pulverulent batch constituents is preheated by contact with hot gases, and the preheated mixture is transferred to a liquefying stage where it is rendered to an at least partially melted condition, the composition of the mixture being altered by disproportionate entrainment of certain constituents of the mixture by the gases in the preheating stage; characterized by feeding to the mixture downstream from the preheating stage an amount of the depleted constituent sufficient to correct the compositional alternation of the mixture.

18. The method of claim 17 wherein the constituent is added at the liquefying stage.

19. The method of claim 17 wherein the constituent is added downstream from the liquefying stage.

* * * * *